Oct. 27, 1964  J. J. BELL  3,154,096
CHECK VALVES

Filed Aug. 13, 1962  3 Sheets-Sheet 1

INVENTOR.
JOHN J. BELL
BY
Everett F. Wright
ATTORNEY

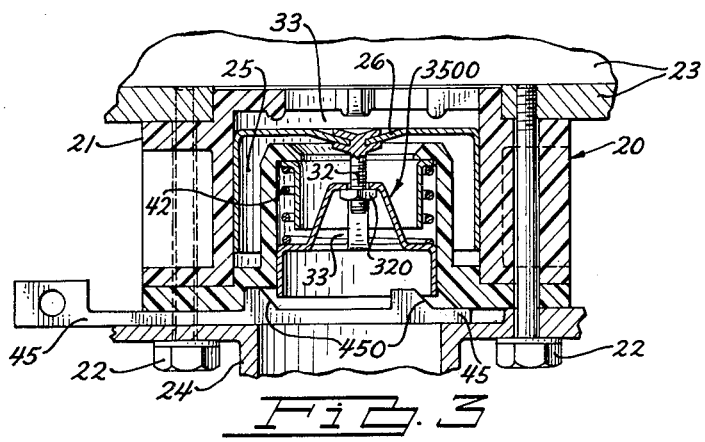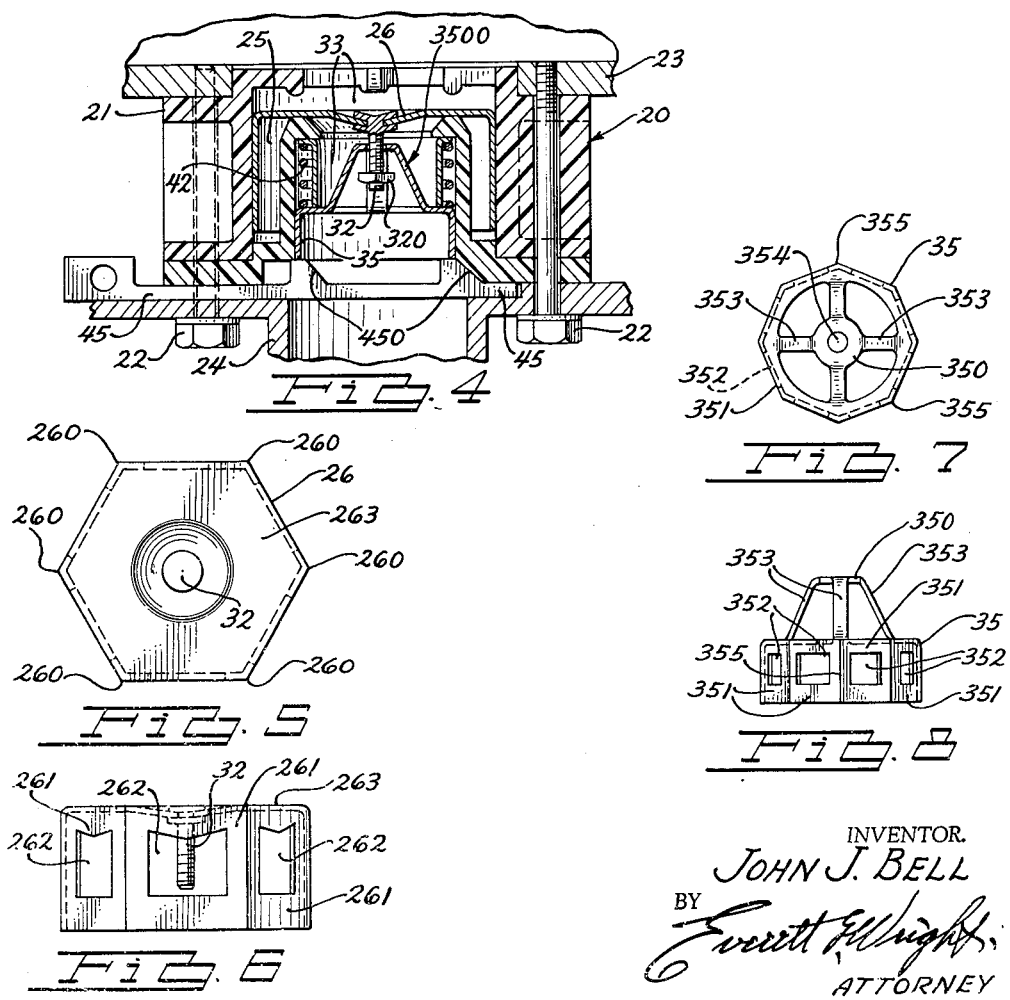

Oct. 27, 1964   J. J. BELL   3,154,096
CHECK VALVES
Filed Aug. 13, 1962   3 Sheets-Sheet 3
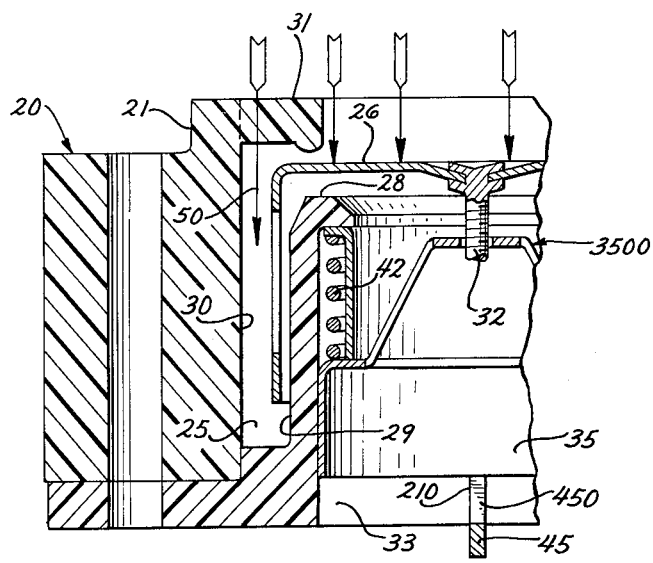
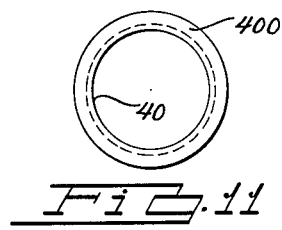
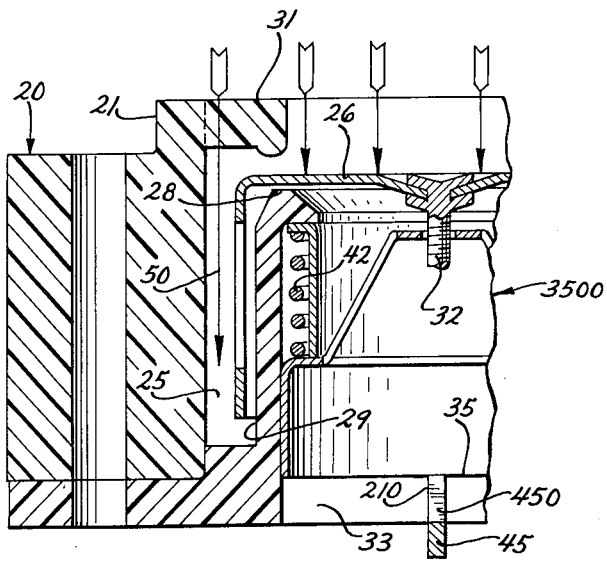
INVENTOR.
JOHN J. BELL
BY
ATTORNEY

# United States Patent Office 3,154,096
Patented Oct. 27, 1964

3,154,096
CHECK VALVES
John J. Bell, 32832 Illinois, Livonia, Mich.
Filed Aug. 13, 1962, Ser. No. 216,350
4 Claims. (Cl. 137—523)

This invention relates to an improvement in check valves of a reciprocating cup type adapted for rapid opening and closing responsive to pressure differentials on opposite sides thereof, such valves, for example, being particularly adapted but not limited to use in place of reed type valves generally employed in two-cycle internal combustion engines of the outboard motor type.

One object of the invention is to provide a cup type check valve having a pressure differential opening and combined pressure differential and spring loaded closing at relatively low speed operation, and a pressure differential opening and closing at high speed operation.

Another object of the invention is to provide a cup type check valve in which the wall of the valve cup is disposed in an annular closed bottom air chamber and polygonally formed for line guidance therein.

Another object of the invention is to provide a cup type check valve operative responsive to pressure differentials on opposite sides thereof including spring means for aiding in closing the valve and clutch means for making said spring closing means inoperative whereby said cup type check valve becomes free floating and operative responsive only to alternating pressure differentials on opposite sides thereof.

Another object of the invention is to provide a cup type free floating valve wherein the periphery of the valve cup is ported and the ported periphery of the said valve cup operates in an annular air chamber responsive to alternating pressure differentials on opposite side of the bottom of the valve cup.

A further object of the invention is to provide a cup type check valve having its walls mounted in an annular closed bottom air chamber, the said valve being ported through the cup walls at and below the open end of said air chamber whereby to cause a reversal of air pressure within said air chamber and thereby substantially eliminate back-flow through the valve.

Other objects of the invention will become apparent by reference to the following detailed description taken in connection with the accompanying drawings in which:

FIG. 1 is a top plan view of a check valve embodying the invention.

FIG. 2 is a cross sectional view taken on the line 2—2 of FIG. 1 showing the check valve mounted at one end in the air-gas mixture opening provided therefor in the crankcase of a two-cycle engine and having the other end thereof connected to the intake manifold from the engine carburetor; the valve being shown in its fully open position where it has moved responsive to pressure differentials, and with the valve clutch engaged.

FIG. 3 is a cross sectional view taken on the line 3—3 of FIG. 1 showing the check valve in a half-closed position, the valve clutch being shown in its disengaged position for slow engine speed operation wherein the check valve is being spring aided in closing in addition to its being closed responsive to pressure differentials.

FIG. 4 is a cross sectional view similar to FIG. 3 except that the valve clutch is shown in its engaged position wherein the check valve is free floating in its opening and closing responsive to pressure differentials.

FIGS. 5 and 6 are top plan and side elevational views respectively of the hexagonal cup valve element preferably employed.

FIGS. 7 and 8 are top plan and side elevational views respectively of the octagonal valve clutch preferably employed.

FIG. 9 is an enlarged fragmentary sectional view of the check valve with the valve clutch engaged for high speed free floating pressure differential valve operation, and with the valve beginning to close.

FIG. 10 is an enlarged fragmentary sectional view of the check valve with the valve clutch engaged for high speed free floating pressure differential valve operation, and with the valve substantially closed.

FIGS. 11 and 12 are top plan and side elevational views respectively of the spring closure ferrule preferably employed.

Figure 1:
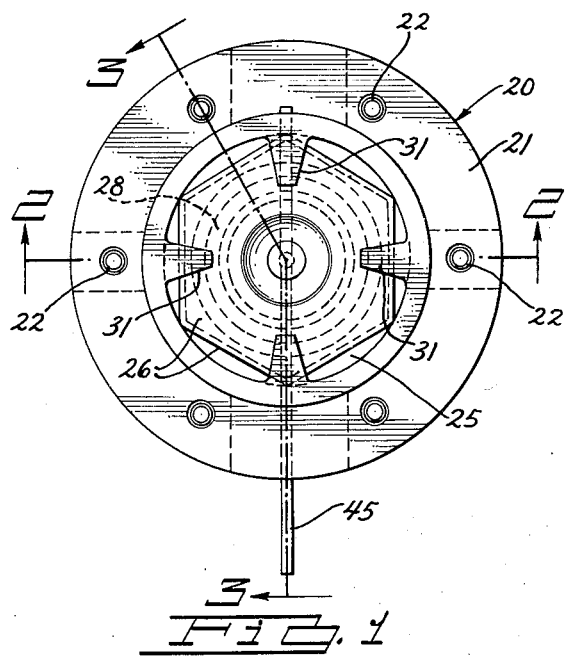

Referring now to the drawings wherein like reference numerals refer to like and corresponding parts throughout the several views, the particular check valve 20 disclosed for illustrative purposes consists of a valve body 21 shown connected by studs 22 between the crankcase 23 of a two-cycle internal combustion engine and a carburetor manifold 24.

The check valve 20 in the attitude shown in the drawings is an inverted cup type, and of course can be employed in other environments than hereinabove mentioned. However, it has been found that two-cycle engines equipped with a valve embodying the invention function excellently both at low speeds, such as when trolling with an outboard motor, and at normal and high speeds. Although the invention is described herein as having auxiliary clutch controlled spring assist closing means, in some uses of the valve, the spring assist closing means may be omitted, and the valve will function at all times as a free-floating cup type valve.

The body 21 of the check valve 20 is preferably formed of a heat resistant plastic and has an annular upwardly open valve cup cavity or annular closed bottom air chamber 25 into which an inverted valve cup 26 is reciprocatingly mounted therein. The said valve body 21 has an annular valve seat 28 at the top of the inner annular wall 29 defining the inner wall of the valve cup cavity 25, the outer annular wall 30 defining the outer wall of the valve cup cavity 25 being also the outer wall of the valve body 21. A plurality of ears 31 which cantilever radially inwardly from the said outer annular wall 30 in spaced relationship above the annular valve seat 28 limit the opening movement of the inverted valve cup 26 above the annular valve seat 28. It is important to note that it is preferable that top of the outer annular wall 30 defining the valve cup cavity 25 extends somewhat above the top of the annular valve seat 28 located at the top of the inner annular wall 29.

In the particular embodiment of the invention disclosed herein, the inverted valve cup 26 is preferably hexagonal as shown in FIGS. 5 and 6. The corners 260 of the said inverted valve cup 26 serve as line guides to maintain the said valve cup 26 in an anti-frictional reciprocating relationship within the valve cup cavity 25 of the valve body 21. The sides 261 of the inverted hexagonal valve cup 26 are preferably apertured at 262, the top of the said apertures 262 preferably being substantially at the same elevation as the valve seat 28 when the inverted valve cup 26 is in its fully open position as best shown in FIGS. 5 and 6. If a valve clutch is employed to provide improved valve sealing at low speed operation, a clutch pin 32 is fixed in centrally depending relationship from the bottom of the inverted valve cup 26, that is inside the said inverted valve cup as shown throughout the drawings.

An inverted clutch cup 35 having a centrally apertured bottom 350 is telescoped over the said clutch pin 32. The said clutch cup 35 is preferably octagonal as shown in FIGS. 7 and 8 with an aperture 352 in each wall 351 thereof, and has its bottom 350 formed into an open spider 353 and centrally apertured at 354 so as to permit the clutch pin 32 of the inverted valve cup 26 to reciprocate freely therethrough. The corners 355 of the clutch cup 35 serve as line guides to maintain the said clutch cup 35 in an anti-frictional guided relationship within the inner annular clutch cup cavity 33 formed centrally of the valve body 21 bounded by the inner annulus of the annular wall 29 thereof. The annular bottom 280 of the valve seat 28 overlies the upper periphery of the inner annular clutch cup cavity 33 serving as a seat for the flanged spring guide 40 disposed within the annular clutch cup cavity 33. A light compression valve spring 42 is disposed between the flange 400 of the spring guide 40 and the bottom 350 of the clutch cup 35 normally urging the said clutch cup 35 downwardly. A stop 320 is suitably located on the clutch pin 32 for engagement by the clutch cup 35 to provide a spring aid by the compression spring 42 to close the check valve 20 by spring urging the inverted valve cup 26 onto the annular valve seat 28.

Figure 2:
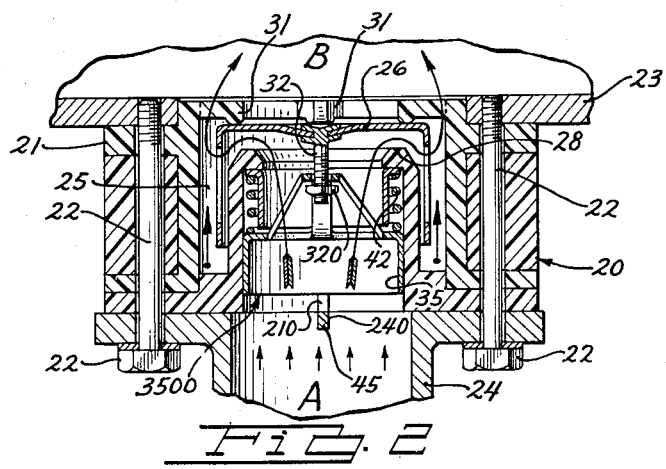
Figures 13, 14:
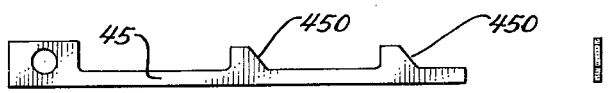
FIGS. 13 and 14 are side elevational and end views respectively of the clutch control key.

The valve clutch 3500 consisting of the clutch cup 35, the clutch pin 32 connected to the inverted valve cup 26, and the clutch pin 32 including its stop 320 is shown in FIGS. 2 and 4 in its engaged position with the sliding clutch operating lever 45 moved inwardly to lift the clutch cup 35 by the clutch lever cams 450 so that the valve cup 26 is free operating.

When the sliding clutch operating lever 45 is moved outwardly, the valve clutch 35 is disengaged, and the spring assist closing of the valve cup 26 occurs. The said sliding clutch operating lever is preferably mounted in suitable aligned slots 210 and 240 in the valve body 21 and the carburetor manifold 24 respectively. Obivously, other clutch operating mechanism may be employed.

During slow speed valve operation with the valve clutch 3500 disengaged as shown in FIG. 3 for example, below 200 r.p.m. engine speed as when an outboard two-cycle motor is throttled down for trolling, the valve spring 42 is operative to close the valve near the end of its closing stroke. This spring closing assist is important for positive valve closing of a valve embodying the invention during extremely low speed engine operation, and may be provided in otherwise free floating check valves embodying the invention.

However, during high speed valve operation, the clutch 3500 is engaged as shown in FIGS. 2 and 4 preferably responsive to engine throttle position by linkage means connected between the engine throttle lever (not shown) and the clutch operating lever 45. Such linkage means, being of any suitable conventional construction, has not been shown or described herein. When the clutch 3500 is engaged, the valve clutch cup 35 compresses the valve spring 42 as indicated in FIG. 4 whereby the valve 20 is free to open and close solely responsive to differentials in pressures on opposite sides of the valve cup 26.

It should be noted that the valve 20 always has atmospheric pressure on its intake or manifold side A. On the engine crankcase side B, the valve 20 is alternately subjected to higher than atmospheric pressures during the power stroke of the piston of a cylinder of a two-cycle engine and to a partial vacuum during the compression stroke of the said piston. Obviously, in multi-cylinder two-cycle engines where each cylinder has its own crankcase cavity, a valve embodying the invention would be used in place of the reed type valve normally employed.

Assume the valve disclosed herein for illustrative purposes to be in its fully open position responsive to the suction stroke of the engine piston and with the valve clutch 3500 engaged as shown in FIGS. 2 and 4. The valve cup 26 is free floating for closing responsive only to pressure differentials thereon. Air-gas mixture at atmospheric pressure from the engine carburetor manifold 24 passing out of the said manifold through the valve cup 26 and into the engine crankcase during the engine suction stroke has created a slight pressure drop in the annular closed bottom air chamber 25.

Upon completion of the engine suction stroke, the power stroke creates a pressure in the engine crankcase which acts upon the bottom of the inverted valve cup 26 to close the same. Simultaneously like pressure is applied as shown by the arrow 50 in FIGS. 9 and 10 to the residual air-gas mixture in the annular closed bottom air chamber 25 which moves downwardly as the cup valve closes creating a substantial pressure rise in the bottom of the said annular closed bottom air chamber. Because of the fact that the annular closed bottom air chamber 25 has sufficient volume or capacity, the closing of the valve occurs before any substantial back flow from the engine crankcase to the carburetor manifold can occur. This phenomenon is accomplished due to the existence of two of the features of the improved check valve 20 herein disclosed and described; namely, (a) the use of an inverted cup shaped valve element 26 having ports 262 through the wall 261 thereof always located at or below the upper periphery of the annular closed bottom air chamber 25, and (b) the employment of an annular closed bottom air chamber 25 having a substantial volume in which the walls of the inverted cup shaped valve are guided, the volume of the said closed bottom air chamber 25 being sufficient to admit of pressure differentials occurring in the bottom thereof—first a pressure drop therein during the closing cycle of the valve (engine intake stroke), and secondly a pressure increase therein during the opening cycle of the valve (engine power stroke).

Although but a single embodiment of the invention has been disclosed and described in detail, it is obvious that many changes may be made in the size, shape, arrangement and detail of the various elements of the invention, all without departing from the spirit and scope thereof as defined by the appended claims.

I claim:

1. In a cup type check valve operable to open and close responsive to pressure differentials on opposite sides thereof, a valve body having a central aperture therethrough, said valve body having an annular closed bottom air chamber therein forming inner and outer annular walls, the inner annular wall defining the said central valve body aperture and the inner periphery of said annular closed bottom air chamber, the outer annular wall forming the outer periphery of said annular closed bottom air chamber, an inverted polygonal valve cup disposed in free telescopic relationship over said inner annular wall with the peripheral wall of said valve cup depending in said annular closed bottom air chamber, the corners of said polygonal valve cup serving as elongated guide means maintaining said valve cup in anti-frictional relationship substantially concentric within said annular closed bottom air chamber, the upper annulus of said inner annular wall being formed to provide a valve seat upon which the inner bottom of said valve cup seats when said valve is closed, stop means extending inwardly from the outer annular wall of said valve body in spaced relationship over said valve seat limiting the opening movement of said valve cup off said valve seat, the said valve cup wall having a plurality of passages therethrough with the top thereof disposed substantially opposite the said valve seat when said valve cup is in its full valve open position, and spring means urging said valve cup to seat during the latter portion of the closing of said valve, said cup type check valve including clutch means comprising an inverted valve clutch cup telescoped freely within the central valve body aperture including a centrally apertured open spider extending upwardly from the bottom thereof, the outer annular portion of the bottom of said valve clutch cup forming a spring seat for said valve closing spring means, the bottom of the annular valve seat for said inverted valve cup being formed to provide an upper fixed abutment for said spring, a clutch pin fixed to and extending downwardly from the said clutch cup telescoping freely through the central aperture in said open clutch cup spider, stop means on said clutch pin below the centrally apertured upper portion of said valve located for engagement by said clutch cup to close said check valve, and a cammed clutch lever adapted to lift said clutch cup in respect to said valve seat whereby to make said valve closing spring inoperative.

2. In a cup type check valve operable to open and close responsive to pressure differentials on opposite sides thereof, a valve body having a central aperture therethrough, said valve body having an annular closed bottom air chamber therein forming inner and outer annular walls, the inner annular wall defining the said central valve body aperture and the inner periphery of said annular closed bottom air chamber, the outer annular wall forming the outer periphery of said annular closed bottom air chamber, an inverted polygonal valve cup disposed in free telescopic relationship over said inner annular wall with the peripheral wall of said valve cup depending in said annular closed bottom air chamber, the corners of said polygonal valve cup serving as elongated guide means maintaining said valve cup in antifrictional relationship substantially concentric within said annular closed bottom air chamber, the upper annulus of said inner annular wall being formed to provide a valve seat upon which the inner bottom of said valve cup seats when said valve is closed, stop means extending inwardly from the outer annular wall of said valve body in spaced relationship over said valve seat limiting the opening movement of said valve cup off said valve seat, the said valve cup wall having a plurality of passages therethrough with the top thereof disposed substantially opposite the said valve seat when said valve cup is in its full valve open position, and spring means urging said valve cup to seat during the latter portion of the closing of said valve, said cup type check valve including clutch means comprising an inverted polygonal valve clutch cup telescoped freely within the central valve body aperture including a centrally apertured open spider extending upwardly from the bottom thereof, the corners of said polygonal clutch cup serving as guide means maintaining said clutch cup in antifrictional relationship within said valve body aperture, the outer annular portion of the bottom of said valve clutch cup forming a spring seat for said valve closing spring means, the bottom of the annular valve seat for said inverted valve cup being formed to provide an upper fixed abutment for said spring, a clutch pin fixed to and extending downwardly from the said clutch cup telescoping freely through the central aperture in said open clutch cup spider, stop means on said clutch pin below the centrally apertured upper portion of said valve located for engagement by said clutch cup to close said check valve, and a cammed clutch lever adapted to lift said clutch cup in respect to said valve seat whereby to make said valve closing spring inoperative.

3. In a cup type check valve operable to open and close response to pressure differentials on opposite sides thereof, a valve body having a central aperture therethrough, said valve body having an annular closed bottom air chamber therein forming inner and outer annular walls, the inner annular wall defining the said central valve body aperture and the inner periphery of said annular closed bottom air chamber, the outer annular wall forming the outer periphery of said annular closed bottom air chamber, an inverted polygonal valve cup disposed in free telescopic relationship over said inner annular wall with the peripheral wall of said valve cup depending in said annular closed bottom air chamber, the corners of said polygonal valve cup serving as elongated guide means maintaining said valve cup in antifrictional relationship substantially concentric within said annular closed bottom air chamber, the upper annulus of said inner annular well being formed to provide a valve seat upon which the inner bottom of said valve cup seats when said valve is closed, stop means extending inwardly from the outer annular wall of said valve body in spaced relationship over said valve seat limiting the opening movement of said valve cup off said valve seat, the said valve cup wall having a plurality of passages therethrough with the top thereof disposed substantially opposite the said valve seat when said valve cup is in its full valve open position, and spring means urging said valve cup to seat during the latter portion of the closing of said valve, said cup type check valve including clutch means comprising an inverted valve clutch cup means telescoped freely within the central valve body aperture, the said valve clutch cup forming a spring seat for said valve closing spring means, the bottom of the annular valve seat for said inverted valve cup being formed to provide an upper fixed abutment for said spring, a clutch pin fixed to and extending downwardly from the said clutch cup telescoping freely through said clutch cup, stop means on said clutch pin below the centrally apertured upper portion of said valve located for engagement by said clutch cup to close said check valve, and a clutch lever adapted to lift said clutch cup whereby to make said valve closing spring inoperative.

4. In a cup type check valve operable to open and close responsive to pressure differentials on opposite sides thereof, a valve body having a central aperture therethrough, said valve body having an annular closed bottom air chamber therein forming inner and outer annular walls, an inverted polygonal valve cup disposed in free telescope relationship over said inner annular wall with the peripheral wall of said valve cup depending in said annular closed bottom air chamber and extending short of the bottom thereof when said valve is closed, the corners of said polygonal valve cup serving as elongated guide means maintaining said valve cup in antifrictional relationship substantially concentric within said annular closed bottom air chamber, the upper annulus of said inner annular wall being formed to provide a valve seat upon which the inner bottom of said valve cup seats when said valve is closed, a plurality of circumferentially spaced stop means extending radially inwardly from the outer annular wall of said valve body in spaced relationship over said valve seat limiting the opening movement of said valve cup off said valve seat, an inverted valve clutch cup means telescoped freely within the central valve body aperture, the said valve clutch cup forming a spring seat for said valve closing spring means, the bottom of the annular valve seat for said inverted valve cup being formed to provide an upper fixed abutment for said spring, a clutch pin fixed to and extending downwardly from the said clutch cup telescoping freely through said clutch cup, stop means on said clutch pin below the centrally apertured upper portion of said valve located for engagement by said clutch cup to close said check valve, and a clutch lever adapted to lift said clutch cup whereby to make said valve closing spring inoperative.

References Cited by the Examiner

UNITED STATES PATENTS

| | | | |
|---|---|---|---|
| 1,292,962 | 1/19 | Pocock | 137—533.17 XR |
| 2,003,590 | 6/35 | Hapgood | 137—533.17 XR |
| 2,430,427 | 11/47 | Katcher | 137—543.21 |
| 2,469,998 | 5/49 | Smith | 137—543.21 XR |
| 2,557,491 | 6/51 | Wright | 137—523 |

FOREIGN PATENTS 1,087,322   8/60   Germany.

ISADOR WEIL, *Primary Examiner.*

WILLIAM F. O'DEA, *Examiner.*